(12) United States Patent
Badea et al.

(10) Patent No.: US 10,178,015 B2
(45) Date of Patent: Jan. 8, 2019

(54) METHODS, SYSTEMS, AND COMPUTER READABLE MEDIA FOR TESTING NETWORK EQUIPMENT DEVICES USING CONNECTIONLESS PROTOCOLS

(71) Applicant: Ixia, Calabasas, CA (US)

(72) Inventors: Alexandru Badea, Bucharest (RO); Radu Bulboaca, Bucharest (RO); Emilian-Mihai Filipescu, Ramnicu Valcea (RO); Marius-Gabriel Ionescu, Ploiesti/Prahova (RO)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 251 days.

(21) Appl. No.: 15/077,832

(22) Filed: Mar. 22, 2016

(65) Prior Publication Data

US 2017/0272352 A1    Sep. 21, 2017

(30) Foreign Application Priority Data

Mar. 21, 2016    (RO) .................................. 2016 00199

(51) Int. Cl.
  *G06F 15/173*  (2006.01)
  *H04L 12/26*   (2006.01)
  *H04L 29/12*   (2006.01)
  *H04L 29/06*   (2006.01)

(52) U.S. Cl.
  CPC ............ *H04L 43/50* (2013.01); *H04L 61/256* (2013.01); *H04L 69/16* (2013.01)

(58) Field of Classification Search
  CPC ........ H04L 43/50; H04L 69/16; H04L 61/256
  See application file for complete search history.

(56) References Cited

U.S. PATENT DOCUMENTS

| 5,343,463 | A | 8/1994 | van Tetering et al. |
| 5,477,531 | A | 12/1995 | McKee et al. |
| 5,600,632 | A | 2/1997 | Schulman |
| 5,742,760 | A | 4/1998 | Picazo, Jr. et al. |
| 5,787,283 | A | 7/1998 | Chin et al. |
| 5,850,386 | A | 12/1998 | Anderson et al. |

(Continued)

OTHER PUBLICATIONS

Notice of Allowance and Fee(s) Due for U.S. Appl. No. 12/627,925 (dated Aug. 26, 2011).

(Continued)

*Primary Examiner* — Richard G Keehn

(57) ABSTRACT

The subject matter described herein relates to methods, systems, and computer readable media for testing network equipment devices using connectionless protocols. In some examples, a method for testing a network equipment device under test (DUT) includes transmitting a first message using a connectionless protocol for a network flow to the network equipment DUT according to a test script. The method includes storing a record for the network flow including a first flow identifier for the flow based on a first payload of the first message. The method includes receiving a second message from the network equipment DUT and determining that the second message belongs to the network flow by determining a second flow identifier based on a second payload of the second message and matching the second flow identifier to the first flow identifier.

17 Claims, 4 Drawing Sheets

(56) References Cited

U.S. PATENT DOCUMENTS

| | | | |
|---|---|---|---|
| 5,878,032 | A | 3/1999 | Mirek et al. |
| 5,982,753 | A | 11/1999 | Pendleton et al. |
| 6,028,847 | A | 2/2000 | Beanland |
| 6,041,053 | A | 3/2000 | Douceur et al. |
| 6,065,053 | A | 5/2000 | Nouri et al. |
| 6,088,777 | A | 7/2000 | Sorber |
| 6,172,989 | B1 | 1/2001 | Yanaihara et al. |
| 6,233,256 | B1 | 5/2001 | Dieterich et al. |
| 6,252,891 | B1 | 6/2001 | Perches |
| 6,295,557 | B1 | 9/2001 | Foss et al. |
| 6,360,332 | B1 | 3/2002 | Weinberg et al. |
| 6,446,121 | B1 | 9/2002 | Shah et al. |
| 6,545,979 | B1 | 4/2003 | Poulin |
| 6,601,098 | B1 | 7/2003 | Case et al. |
| 6,717,917 | B1 | 4/2004 | Weissberger |
| 6,728,929 | B1 | 4/2004 | Luong |
| 6,789,100 | B2 | 9/2004 | Nemirovsky et al. |
| 6,820,034 | B1 | 11/2004 | Hanes et al. |
| 6,823,219 | B2 | 11/2004 | Lee et al. |
| 6,888,818 | B1 | 5/2005 | Gubbi |
| 6,910,061 | B2 | 6/2005 | Hu et al. |
| 6,950,405 | B2 | 9/2005 | Van Gerrevink |
| 7,007,089 | B2 | 2/2006 | Freedman |
| 7,035,223 | B1 | 4/2006 | Burchfiel et al. |
| 7,088,735 | B1 | 8/2006 | Reohr, Jr. et al. |
| 7,187,683 | B1 | 3/2007 | Sandoval et al. |
| 7,295,555 | B2 | 11/2007 | Elzur |
| 7,406,089 | B1 | 7/2008 | Rahim et al. |
| 7,443,870 | B2 | 10/2008 | Zioulas et al. |
| 7,451,458 | B2 | 11/2008 | Tuchow |
| 7,489,706 | B2 | 2/2009 | Hatley et al. |
| 7,561,559 | B2 | 7/2009 | Hannel et al. |
| 7,594,159 | B2 | 9/2009 | Fujikami et al. |
| 7,643,431 | B2* | 1/2010 | Pepper .............. H04L 43/028 370/252 |
| 7,826,377 | B2 | 11/2010 | Pepper |
| 7,826,381 | B1 | 11/2010 | Kastuar et al. |
| 8,050,175 | B2 | 11/2011 | Pepper |
| 8,219,675 | B2* | 7/2012 | Ivershen .............. H04L 43/026 709/224 |
| 8,310,942 | B2 | 11/2012 | Gintis et al. |
| 8,391,157 | B2 | 3/2013 | Ginsberg et al. |
| 8,582,466 | B2 | 11/2013 | Gintis et al. |
| 9,531,620 | B2 | 12/2016 | Ciodaru et al. |
| 9,553,786 | B2 | 1/2017 | Bergeron |
| 2001/0016867 | A1 | 8/2001 | Hu et al. |
| 2002/0172158 | A1* | 11/2002 | Hoefelmeyer ...... H04L 12/4604 370/241 |
| 2002/0183969 | A1 | 12/2002 | Hanes et al. |
| 2003/0033025 | A1 | 2/2003 | Lee et al. |
| 2004/0037277 | A1 | 2/2004 | Mathews et al. |
| 2004/0052259 | A1 | 3/2004 | Garcia et al. |
| 2004/0131013 | A1 | 7/2004 | Ise et al. |
| 2004/0158744 | A1 | 8/2004 | Deng et al. |
| 2004/0252686 | A1 | 12/2004 | Hooper et al. |
| 2005/0013251 | A1 | 1/2005 | Wang et al. |
| 2005/0286564 | A1 | 12/2005 | Hatley et al. |
| 2006/0088060 | A1 | 4/2006 | Fujikami et al. |
| 2006/0153078 | A1 | 7/2006 | Yasui |
| 2007/0115833 | A1 | 5/2007 | Pepper et al. |
| 2007/0291654 | A1 | 12/2007 | Pepper |
| 2008/0112332 | A1 | 5/2008 | Pepper |
| 2008/0317233 | A1* | 12/2008 | Rey .................... H04M 3/4938 379/210.01 |
| 2009/0310491 | A1 | 12/2009 | Ginsberg et al. |
| 2010/0069092 | A1* | 3/2010 | Bajpai .................... H04W 4/02 455/456.3 |
| 2010/0074135 | A1 | 3/2010 | Pepper |
| 2011/0078319 | A1* | 3/2011 | Ishida ................ H04L 65/1063 709/228 |
| 2012/0051234 | A1 | 3/2012 | Gintis et al. |
| 2013/0331082 | A1* | 12/2013 | Topaltzas .............. H04W 24/06 455/419 |
| 2014/0016479 | A1* | 1/2014 | Coomber ................ H04L 43/50 370/241.1 |
| 2014/0269337 | A1* | 9/2014 | Gintis ..................... H04L 43/50 370/241 |
| 2016/0057040 | A1 | 2/2016 | Bergeron |
| 2018/0013839 | A1* | 1/2018 | Noldus ................ H04L 67/146 |
| 2018/0131586 | A1 | 5/2018 | Ciodaru et al. |

OTHER PUBLICATIONS

Examiner Initiated Interview Summary and Final Office Action for U.S. Appl. No. 12/627,925 (dated Jun. 17, 2011).

Non-Final Office Action for U.S. Appl. No. 12/627,925 (dated Jan. 21, 2011).

Notice of Allowance and Fee(s) Due for U.S. Appl. No. 11/558,855 (dated Nov. 18, 2009).

Final Office Action for U.S. Appl. No. 11/558,855 (dated Oct. 15, 2009).

Non-Final Office Action for U.S. Appl. No. 11/558,855 (dated Mar. 24, 2009).

Notice of Allowance and Fee(s) Due, Applicant-Initated Interview Summary and AFCP 2.0 Decision for U.S. Appl. No. 14/465,453 (dated Sep. 14, 2016).

Final Office Action for U.S. Appl. No. 14/465,453 (dated Jun. 16, 2016).

Applicant-Initiated Interview Summary for U.S. Appl. No. 14/465,453 (dated Mar. 3, 2016).

Applicant-Initiated Interview Summary for U.S. Appl. No. 14/465,453 (dated Mar. 1, 2016).

Non-Final Office Action for U.S. Appl. No. 14/465,453 (dated Dec. 18, 2015).

Krishnan, "Flow-aware Real-time SDN Analytics (FRSA)," http://blog.sflow.com/2014/02/flow-aware-real-time-sdn-analytics-frsa.html, pp. 1-12 (Feb. 5, 2014).

Notice of Allowance and Fee(s) Due for U.S. Appl. No. 12/870,729 (dated Aug. 31, 2012).

Non-Final Office Action for U.S. Appl. No. 12/870,729 (dated Jul. 2, 2012).

European Search Report for European Patent Application Serial No. 11008066.0 (dated Feb. 10, 2012).

Sadasivan et al., "Architecture for IP Flow Information Export," Network Working Group, pp. 1-31 (Mar. 2009).

Ixia, "IxExplorer User's Guide," Revision 2.1.0, pp. 1-384 (Nov. 1, 1999).

Ixia, "Specifications for Load Modules—Multilayer Gigibit Ethernet for LM1000LX, LM1000SX, LM1000GBIC, LM1000T, Product Specification Sheet," pp. 1-2 (2002).

Ixia, "The Ixia 200 Traffic Generator and Analyzer, Product Description," pp. 1-2 (1997-1999).

Brownlee et al., "Traffic Flow Measurement: Architecture," Network Working Group, The University of Auckland, GTE Laboratories, Inc. and GTE Internetworking, pp. 1-49 (Oct. 1999).

Ixia, "Ixia 200 Chassis, Product Description," pp. 1 (1999).

Commonly-assigned, co-pending U.S. Appl. No. 15/626,628 for "Methods, Systems, and Computer Readable Media for Network Traffic Statistics Collection," (Unpublished, filed Nov. 29, 2017).

* cited by examiner

METHODS, SYSTEMS, AND COMPUTER READABLE MEDIA FOR TESTING NETWORK EQUIPMENT DEVICES USING CONNECTIONLESS PROTOCOLS

PRIORITY CLAIM

This application claims the benefit of Romanian Patent Application No. a 2016 00199 filed Mar. 21, 2016; the disclosure of which is incorporated herein by reference in its entirety.

TECHNICAL FIELD

The subject matter described herein relates generally to communications test systems. More particularly, the subject matter described herein relates to methods, systems, and computer readable media for testing network equipment devices using connectionless protocols.

BACKGROUND

Network test systems can measure and test various aspects of data communications networks such as network performance and service status. Network test systems can be used to detect and resolve network issues, improving network performance and user experience. Some network test systems operate by executing test scripts to transmit data over a data communications network at one endpoint and receive the data at another endpoint. The received data can be compared to the transmitted data to determine some aspects of network performance, such as whether a particular network device is operating according to performance specifications of the network device.

In some network test systems, test scripts can be configured to track network flows to determine some aspects of network performance. For example, a network test system transmitting test messages using a connection-oriented protocol (e.g., transmission control protocol (TCP)) can track network flows using the connection setup and tear down messages. In another example, a network test system transmitting test messages using a connectionless protocol (e.g., user datagram protocol (UDP)) can track network flows using variables stored in message headers such as internet protocol (IP) type, source IP address, source port, destination IP address, and destination port. In that case, the network test system will be unable to track flows where intervening network equipment alters the variables used. For example, in a network address translation (NAT) testing environment, at least one IP address will be translated, thus making it difficult to identify the originating flow on the receiving end of the transmission.

In light of these difficulties, there exists a need for methods, systems, and computer readable media for testing network equipment devices using connectionless protocols.

SUMMARY

The subject matter described herein relates to methods, systems, and computer readable media for testing network equipment devices using connectionless protocols. In some examples, a method for testing a network equipment device under test (DUT) includes transmitting a first message using a connectionless protocol for a network flow to the network equipment DUT according to a test script. The method includes storing a record for the network flow including a first flow identifier for the flow based on a first payload of the first message. The method includes receiving a second message from the network equipment DUT and determining that the second message belongs to the network flow by determining a second flow identifier based on a second payload of the second message and matching the second flow identifier to the first flow identifier.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

DETAILED DESCRIPTION

Figure 1:
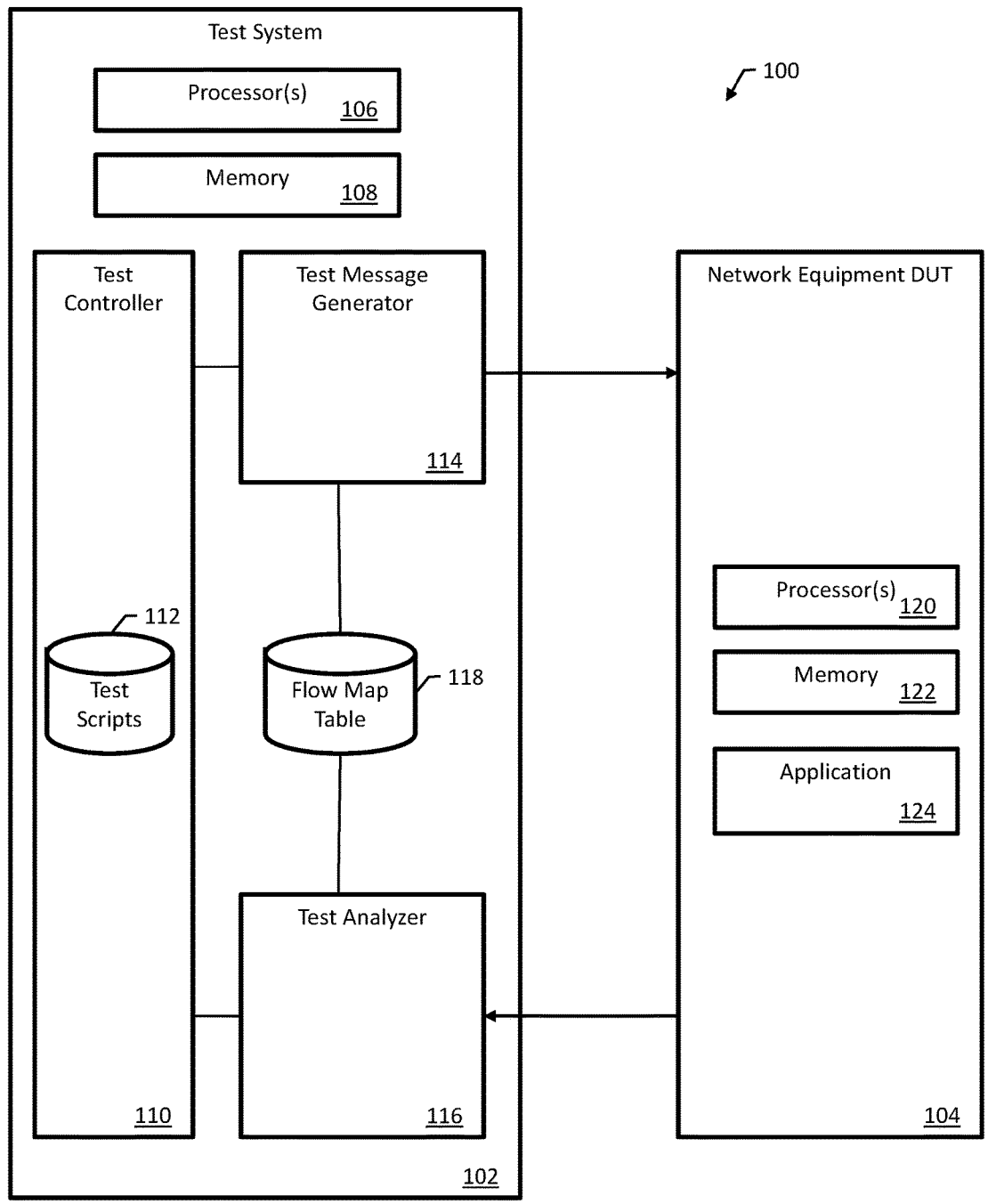
FIG. 1 is a block diagram of an example communications environment including a network equipment test device configured to test a network equipment device under test (DUT)

FIG. 1 is a block diagram of an example communications environment 100 including a network equipment test device 102 configured to test a network equipment device under test (DUT) 104. Network equipment test device 102 may be one or more physical devices that send test messages to DUT 104 and that monitors the response of DUT 104.

Network equipment test device 102 includes one or more processors 106 and memory 108. Memory 108 can store executable instructions for processors 106 that, when executed by processors 106, causes processors 106 to perform operations for testing DUT 104. The instructions can include software that is loaded into random access memory (RAM) and executed by processors 106.

Network equipment test device 102 includes a test controller 110, implemented using processors 106 and memory 108, for executing one or more test scripts selected from a repository of test scripts 112. A test script specifies a sequence of messages to be exchanged over a data communications network. A message can be, e.g., a user datagram protocol (UDP) datagram or an Internet protocol (IP) packet or a related number of IP packets or other packets. In general, a message includes header information and a payload, and the header information includes network routing information and the payload includes information to be consumed at the destination of the message. A test script can specify various other data for implementing a test, for example, failure conditions that test controller 110 can use to determine whether a given test is successful.

Network equipment test device 102 includes a test message generator 114 and a test analyzer 116 that are implemented using processors 106 and memory 108. Test message generator 114 and test analyzer 116 can be implemented as, for example, two separate software processes executing on a computer system, or as two separate hardware units under control of the test controller 110 by separate data connections. Test controller 110 uses test message generator 114 and test analyzer 116 to exchange sequences of messages by way of a data communications network connection that passes through DUT 104. Test analyzer 116 is configured for analyzing received messages in accordance with the test script and producing test reports for DUT 104 based on analyzing the received messages.

DUT 104 can be any appropriate type of network equipment device. For example, DUT 104 can be a router, a firewall, or a network address translation (NAT) gateway or firewall. DUT 104 includes one or more processors 120 and memory 122. Memory 122 can store executable instructions for processors 106 that, when executed by processors 106, causes processors 106 to perform network operations. The instructions can include software that is loaded into random access memory (RAM) and executed by processors 106. For example, DUT 104 includes an application 124 that is configured to perform a network function, e.g., a network address translation function or any appropriate network function.

Network address translation can include remapping one IP address space into another by modifying network address information in IP packet headers while the packets are in transit. For example, network address translation can hide an IP address space of private network IP addresses behind a single IP address in a public address space. In some examples, DUT 104 operates as a NAT gateway by using stateful translation tables to map IP addresses from one IP address space to another.

Test message generator 114 and test analyzer 116 are configured to track network flows using a flow map table 118. A network flow is a sequence of messages from a source computer system to a destination. The destination can be another computer system or a group of computer systems, e.g., a multicast group or a broadcast domain. For example, a network flow can be all of the packets or datagrams in a specific transport connection or media stream. In the case where test message generator 114 and test analyzer 116 are using UDP, a network flow can include all datagrams matching a flow tuple. A flow tuple includes a number of variables related to the source and destination addresses. For example, the flow tuple can include the source IP address, the source port, the destination IP address, the destination port, and optionally the protocol in use (i.e., UDP in this case, or a Layer 4 protocol in general).

Tracking network flows can be useful for, e.g., producing certain kinds of test reports or running certain kinds of tests on DUT 104. In some cases, however, test message generator 114 and test analyzer 116 cannot use a flow tuple to track network flows because one or more of the variables in the flow tuple are altered during a test. For example, suppose that DUT 104 is a NAT gateway, e.g., a source NAT (SNAT) or destination NAT (DNAT). DUT 104 will alter the destination IP address or destination port or both of messages from test message generator 114 that are addressed to test analyzer 116.

In such cases, test message generator 114 and test analyzer 116 can track network flows using other information. For example, test message generator 114 can be configured for transmitting a first message for a network flow to DUT 104 and for storing a record for the network flow in flow map table 118. The record includes a flow identifier for the network flow, and the flow identifier is based on the payload of the first message. Test analyzer 116 can be configured for receiving a second message from DUT 104 and determining that the second message belongs to the network flow using flow map table 118. Test analyzer 116 determines a second flow identifier based on the payload of the second message and matches the second flow identifier to the first flow identifier.

In some examples, test message generator 114 and test analyzer 116 determine flow identifiers by hashing message payloads. Any appropriate hashing algorithm can be used, for example, a message-digest algorithm or a secure hash algorithm or an adapted checksum or fingerprinting algorithm. If the payload of a message is not altered during the test, and test message generator 114 and test analyzer 116 use the same hashing algorithm, then the flow identifier will be the same for the first message and the second message. Test message generator 114 can use the flow identifier as an index to flow map table 118, and test analyzer 116 can then determine that the second message belongs to the network flow by searching flow map table 118 and finding the record for the network flow. Test analyzer 116 can optionally confirm the match by comparing the entire payload of the second message to the entire payload of the first message.

In general, test message generator 114 and test analyzer 116 will use a hashing algorithm that produces a flow identifier that is smaller than the message payload, which reduces the computing resources used in comparison to storing and comparing the entire message payload. Moreover, in general, test message generator 114 and test analyzer 116 will apply the hashing algorithm to the entire message payload, i.e., to every part of the message except for the routing information. Hashing the entire message payload relieves test message generator 114 and test analyzer 116 from identifying specific portions of the payload that may or may not vary while in transit. For example, for a session initiation protocol (SIP) message, test message generator 114 and test analyzer 116 can hash the entire message body and omit the message header from the hashing algorithm. Hashing the entire message payload can also reduce the chances of a collision in flow map table 118.

In some other examples, instead of hashing message payloads, test message generator 114 and test analyzer 116 determine flow identifiers by generating unique cookies, e.g., sequences of bytes that are unique to each flow having a record in flow map table 118, that are embedded into messages belonging to the network flow. For example, suppose that test controller 110 is executing a test script for an application protocol where DUT 104 will alter at least one message payload. Test message generator 114 can be configured to embed a unique cookie for a network flow into the first message of the flow to DUT 104 and add the unique cookie to the record for the network flow in flow map table 118. Test analyzer 116 can then receive a second message from DUT 104 and determine that the second message belongs to the network flow by extracting the unique cookie from the second message and searching flow map table 118 for the unique cookie.

In those examples, test message generator 114 embeds the unique cookie into the message in a manner so that the message will still be routed as if the cookie had not been embedded, e.g., by embedding the cookie in a position of the message that is not reserved for routing information. For example, suppose that the application protocol is a session initiation protocol (SIP) over UDP (SIP over UDP) and the first message is a SIP INVITE message. Test message generator 114 can embed the cookie into a message header of the SIP INVITE message.

Test controller 110 can determine whether or not to use hashing message payloads or embedding cookies in any appropriate manner. For example, test scripts may specify which method to use, and a system engineer may configured the test script based on knowledge of whether or not DUT 104 is expected to alter the message payload. In another example, test controller 110 determines which method to use based on a type of test to execute, a type of network used to communicate with DUT 104, or any other appropriate information available to test controller 110.

To conserve computing resources, test message generator 114 and test analyzer 116 may use the flow identifier for one or more initial messages, and then use a flow tuple for tracking one or more subsequently received messages belonging to the network flow. For example, test message generator 114 and test analyzer 116 may use the flow identifier for the first message transmitted in the flow and then capture a flow tuple from the resulting message received by test analyzer 116. By adding the flow tuple to the record for the network flow in flow map table 118, test analyzer 116 can determine that the subsequent messages belong to the network flow by searching for the flow tuples of the subsequent messages in flow map table 118, thus avoiding the computing overhead of the hashing algorithm.

In some examples, test message generator 114 adds the record for the network flow by capturing a flow tuple from the first message of the network flow. Test message generator 114 determines that flow map table 118 lacks a record for the network flow using the flow tuple and, in response, adds the record for the network flow to flow map table 118. In some other examples, test controller 110 instructs test message generator 114 to initiate a new flow by adding a record to flow map table 118 for the new flow while executing a test script.

Figure 2:
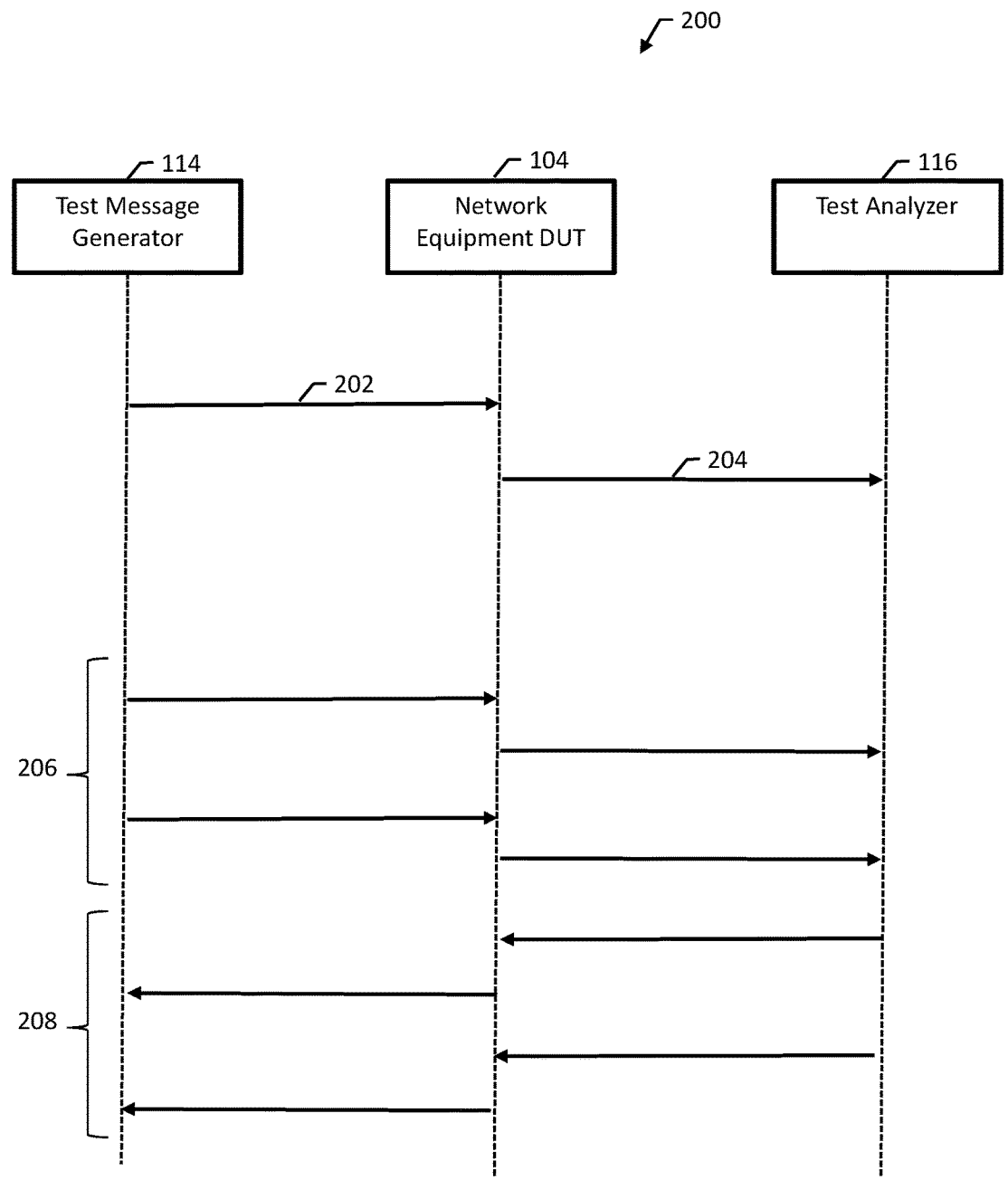
FIG. 2 is a message diagram illustrating an example exchange of a sequence of messages.
Figure 3A:
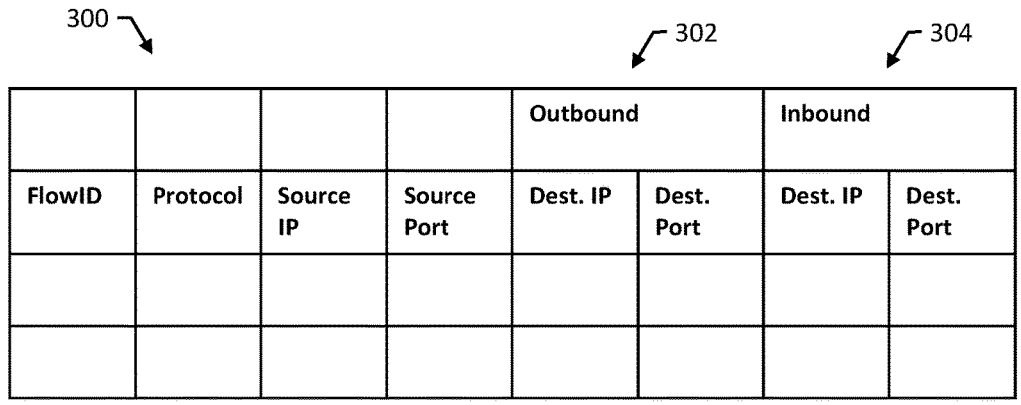
FIGS. 3A-C illustrate an example flow map table.
Figure 3B:
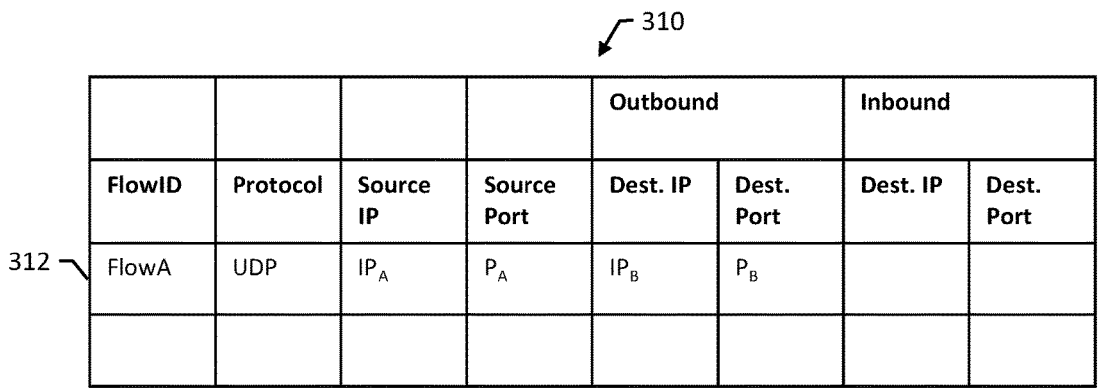
Figure 3C:
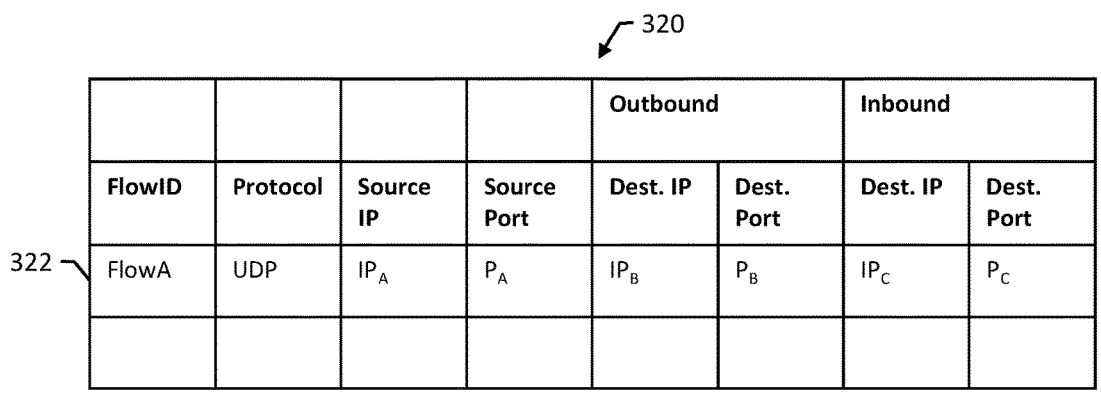

FIG. 2 is a message diagram 200 illustrating an example exchange of a sequence of messages. FIGS. 3A-C illustrate states of an example flow map table during the sequence of messages illustrated in message diagram 200. FIGS. 2 and 3A-C will be described together for purposes of illustration.

FIG. 3A shows an initial flow map table 300. Flow map table 300 includes columns for a flow identifier, a communications protocol for a flow, a source IP address and source port. Flow map table 300 also includes columns for a destination IP address and a destination port. Flow map table 300 includes columns for the destination IP address and destination port of outbound messages 302, i.e., messages being sent from the source to the destination, and for inbound messages 304, i.e., messages being received at the destination after the destination IP address and destination port have been translated. Initial flow map table 300 is initially empty, i.e., does not include any flow records.

Referring to FIG. 2, test message generator 114 transmits a first message 202 for a network flow to DUT 104 according to a test script. Test message generator 114 stores a record for the network flow in the flow map table 300, e.g., either before or after or at the same time as transmitting first message 202. FIG. 3B shows the flow map table 310 after test message generator 114 adds a record 312 for the network flow for first message 202. Record 312 includes a flow identifier, FlowA, which is based on the payload of first message 202. Record 312 also includes the values for the flow tuple extracted from first message 202, i.e., that the protocol is UDP, source IP address and source port are $IP_A$ and $P_A$, and that first message 202 includes a destination IP address and port of $IP_B$ and $P_B$.

Referring to FIG. 2, DUT 104 translates the destination IP address of first message 202 and transmits a second message 204 that includes the payload of first message 202 and a different destination IP address or destination source or both. Test analyzer 116 receives second message 204 and determines a flow identifier for second message 204 based on the payload second message 204. Since second message 204 has the same payload as first message 202, the flow identifier for second message 204 will be FlowA.

Test analyzer 116 matches the flow identifier to the flow map table 310 and determines that second message 204 belongs to the same flow as first message 202. In response, test analyzer 116 extracts the flow tuple from second message 204 and adds the flow tuple to the flow map table 310.

FIG. 3C shows the flow map table 320 after test analyzer adds the flow tuple for second message 204 to the record 322 for the network flow. Record 322 now includes information specifying that second message 204 included a destination IP address and port of $IP_C$ and $P_C$, indicating that DUT 104 translated $IP_B$ and $P_B$ to $IP_C$ and $P_C$.

Referring to FIG. 2, test message generator 114 sends a number of subsequent messages 206 to DUT 104. DUT 104 sends translated messages to test analyzer 116. Test analyzer 116 can determine that the subsequent messages 206 belong to the network flow by extracting the flow tuples of the subsequent messages 206 and matching them to $IP_C$ and $P_C$ in flow map table 320. Test analyzer 116 can start a new flow by sending responsive messages 208 back to test message generator 114, and the new flow can be tracked in the same manner.

Figure 4:
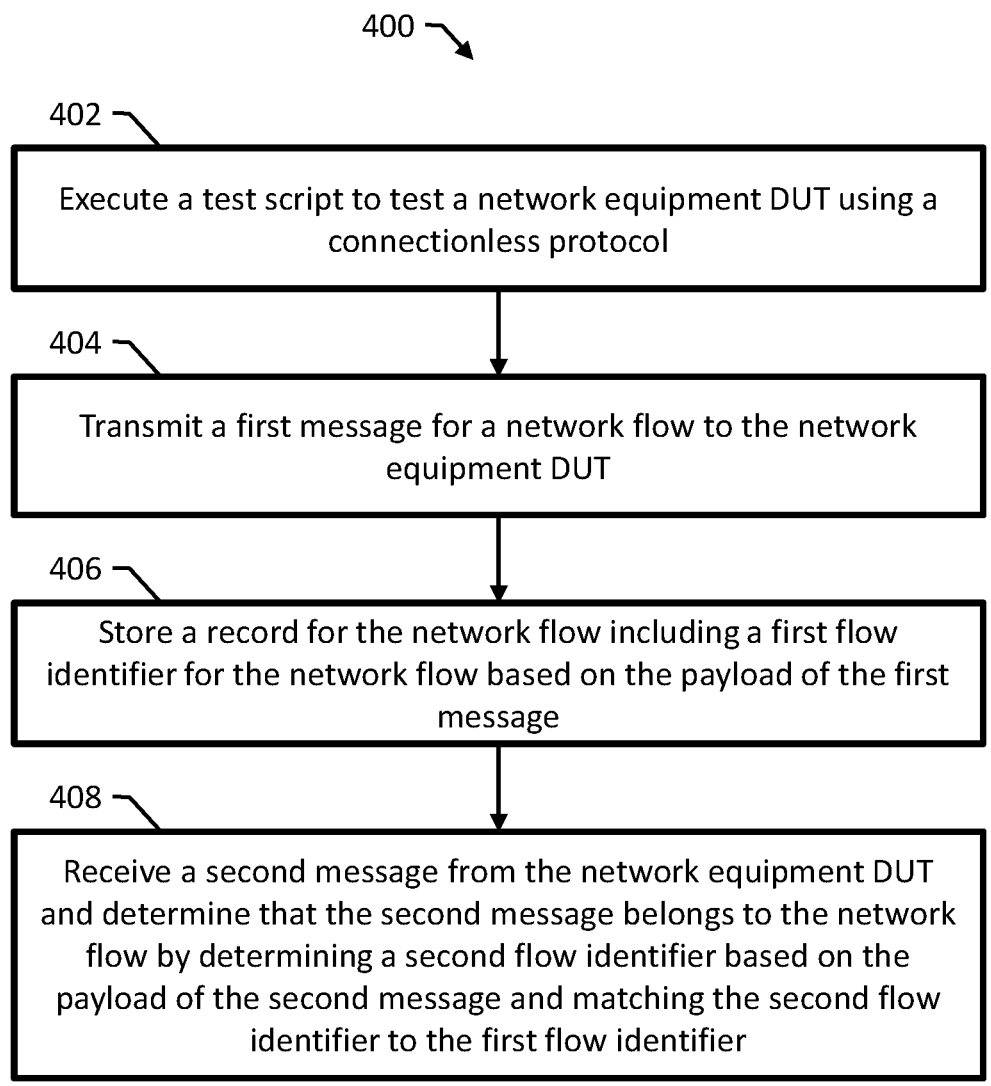
FIG. 4 is a flow chart of an example method for testing a network equipment DUT.

FIG. 4 is a flow chart of an example method 400 for testing a network equipment DUT. The method is performed by a network equipment test device, e.g., the network equipment test device 102 of FIG. 1. The network equipment test device executes a test script to test the network equipment DUT by sending and receiving network traffic to the network equipment DUT using a connectionless protocol (402).

The network equipment test device transmits a first message for a network flow to the network equipment DUT according to the test script (404). The network equipment test device stores a record for the network flow including a first flow identifier for the network flow based on a first payload of the first message (406). The network equipment test device receives a second message from the network equipment DUT and determines that the second message belongs to the network flow by determining a second flow identifier based on a second payload of the second message and matching the second flow identifier to the first flow identifier (408).

In some examples, storing the record for the network flow includes determining the first flow identifier by hashing the first payload of the first message and adding the record and the first flow identifier to a flow map table. Matching the second flow identifier to the first flow identifier can include using the flow map table. Method 400 can include using the first flow identifier to index the flow map table and determining the second flow identifier by hashing the second payload of the second message and searching the flow map table using the second flow identifier.

In some examples, method 400 includes capturing a flow tuple from the second message, adding the flow tuple to the record for the network flow in a flow map table, and determining that one or more subsequently received messages belong to the network flow using the flow tuple. Method 400 can include analyzing the subsequently received messages in accordance with the test script and producing a test report for the network equipment DUT based on analyzing the subsequently received messages.

In some examples, method 400 includes initiating a different flow for an application protocol where the network equipment DUT will alter at least one payload of at least one message for the application protocol. Initiating the different flow can include transmitting a first different message, having a first cookie embedded in the first different message, for the different flow to the network equipment DUT and adding, to a flow map table, a record for the different flow including the first cookie. Initiating the different flow can further include receiving a second different message from the network equipment DUT and determining that the second different message belongs to the different flow by extracting a second cookie from the second different message and matching the second cookie to the first cookie using the flow map table.

For example, the application protocol can be SIP over UDP. Then, the first message can be a SIP INVITE message. Transmitting the first different message can include embedding the first cookie into a message header of the SIP INVITE message.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for testing a network equipment device under test (DUT), the system comprising:
   a network equipment test device including at least one processor and configured to execute a test script to test the network equipment DUT by sending network traffic to and receiving network traffic from the network equipment DUT using a connectionless protocol;
   a test message generator implemented on the network equipment test device and configured for transmitting a first message using the connectionless protocol for a network flow to the network equipment DUT according to the test script and for storing a record for the network flow including a first flow identifier for the network flow based on a first payload of the first message; and
   a test analyzer implemented on the network equipment test device and configured for receiving a second message from the network equipment DUT and determining that the second message belongs to the network flow by determining a second flow identifier based on a second payload of the second message and matching the second flow identifier to the first flow identifier;
   wherein the test analyzer is configured for capturing a flow tuple from the second message, adding the flow tuple to the record for the network flow in a flow map table, and determining that one or more subsequently received messages belong to the network flow using the flow tuple; and
   wherein the test analyzer is configured for analyzing the subsequently received messages in accordance with the test script and producing a test report for the network equipment DUT based on analyzing the subsequently received messages.

2. The system of claim 1, wherein storing the record for the network flow comprises determining the first flow identifier by hashing the first payload of the first message and adding the record and the first flow identifier to a flow map table, and wherein matching the second flow identifier to the first flow identifier comprises using the flow map table.

3. The system of claim 2, wherein the test message generator is configured for using the first flow identifier to index the flow map table, and wherein test analyzer is configured for determining the second flow identifier by hashing the second payload of the second message and searching the flow map table using the second flow identifier.

4. The system of claim 1, wherein the network equipment DUT comprises a network address translation (NAT) device configured to translate an internet protocol (IP) address of the first message.

5. The system of claim 1, wherein the connectionless protocol is the user datagram protocol (UDP).

6. The system of claim 1, wherein adding the record for the network flow comprises capturing a flow tuple from the first message, determining that a flow map table lacks a record for the network flow using the flow tuple, and, in response, adding the record for the network flow to the flow map table.

7. A system for testing a network equipment device under test (DUT), the system comprising:
   a network equipment test device including at least one processor and configured to execute a test script to test the network equipment DUT by sending network traffic to and receiving network traffic from the network equipment DUT using a connectionless protocol;
   a test message generator implemented on the network equipment test device and configured for transmitting a first message using the connectionless protocol for a network flow to the network equipment DUT according to the test script and for storing a record for the network flow including a first flow identifier for the network flow based on a first payload of the first message; and
   a test analyzer implemented on the network equipment test device and configured for receiving a second message from the network equipment DUT and determining that the second message belongs to the network flow by determining a second flow identifier based on a second payload of the second message and matching the second flow identifier to the first flow identifier;
   wherein the test analyzer is configured for producing a test report for the network equipment DUT based on analyzing at least the second message;
   wherein the test analyzer is configured for initiating a different flow for an application protocol where the network equipment DUT will alter at least one payload of at least one message for the application protocol;

wherein the test message generator is configured for initiating the different flow by transmitting a first different message, having a first cookie embedded in the first different message, for the different flow to the network equipment DUT and adding, to a flow map table, a record for the different flow including the first cookie; and wherein the test analyzer is configured for receiving a second different message from the network equipment DUT and determining that the second different message belongs to the different flow by extracting a second cookie from the second different message and matching the second cookie to the first cookie using the flow map table.

8. The system of claim 7, wherein the application protocol is a session initiation protocol (SIP) over a user data protocol (UDP), the first different message is a SIP INVITE message, and transmitting the first different message includes embedding the first cookie into a message header of the SIP INVITE message.

9. A method for testing a network equipment device under test (DUT), the method comprising:

executing, by a network equipment test device including at least one processor, a test script to test the network equipment DUT by sending network traffic to and receiving network traffic from the network equipment DUT using a connectionless protocol;

transmitting, by the network equipment test device, a first message using the connectionless protocol for a network flow to the network equipment DUT according to the test script;

storing, by the network equipment test device, a record for the network flow including a first flow identifier for the network flow based on a first payload of the first message;

receiving, by the network equipment test device, a second message from the network equipment DUT and determining that the second message belongs to the network flow by determining a second flow identifier based on a second payload of the second message and matching the second flow identifier to the first flow identifier;

capturing a flow tuple from the second message, adding the flow tuple to the record for the network flow in a flow map table, and determining that one or more subsequently received messages belong to the network flow using the flow tuple; and analyzing the subsequently received messages in accordance with the test script and producing a test report for the network equipment DUT based on analyzing the subsequently received messages.

10. The method of claim 9, wherein storing the record for the network flow comprises determining the first flow identifier by hashing the first payload of the first message and adding the record and the first flow identifier to a flow map table, and wherein matching the second flow identifier to the first flow identifier comprises using the flow map table.

11. The method of claim 10, comprising using the first flow identifier to index the flow map table and determining the second flow identifier by hashing the second payload of the second message and searching the flow map table using the second flow identifier.

12. The method of claim 9, wherein the network equipment DUT comprises a network address translation (NAT) device configured to translate an internet protocol (IP) address of the first message.

13. The method of claim 9, wherein the connectionless protocol is the user datagram protocol (UDP).

14. The method of claim 9, wherein adding the record for the network flow comprises capturing a flow tuple from the first message, determining that a flow map table lacks a record for the network flow using the flow tuple, and, in response, adding the record for the network flow to the flow map table.

15. A method for testing a network equipment device under test (DUT), the method comprising:

executing, by a network equipment test device including at least one processor, a test script to test the network equipment DUT by sending network traffic to and receiving network traffic from the network equipment DUT using a connectionless protocol;

transmitting, by the network equipment test device, a first message using the connectionless protocol for a network flow to the network equipment DUT according to the test script;

storing, by the network equipment test device, a record for the network flow including a first flow identifier for the network flow based on a first payload of the first message;

receiving, by the network equipment test device, a second message from the network equipment DUT and determining that the second message belongs to the network flow by determining a second flow identifier based on a second payload of the second message and matching the second flow identifier to the first flow identifier;

producing a test report for the network equipment DUT based on analyzing at least the second message;

initiating a different flow for an application protocol where the network equipment DUT will alter at least one payload of at least one message for the application protocol, including:

transmitting a first different message, having a first cookie embedded in the first different message, for the different flow to the network equipment DUT and adding, to a flow map table, a record for the different flow including the first cookie; and receiving a second different message from the network equipment DUT and determining that the second different message belongs to the different flow by extracting a second cookie from the second different message and matching the second cookie to the first cookie using the flow map table.

16. The method of claim 15, wherein the application protocol is a session initiation protocol (SIP) over a user data protocol (UDP), the first different message is a SIP INVITE message, and transmitting the first different message includes embedding the first cookie into a message header of the SIP INVITE message.

17. One or more non-transitory computer readable mediums storing instructions for a network equipment test device comprising at least one processor that, when executed by the at least one processor, cause the at least one processor to perform operations comprising:

executing a test script to test a network equipment device under test (DUT) by sending network traffic to and receiving network traffic from the network equipment DUT using a connectionless protocol;

transmitting a first message using the connectionless protocol for a network flow to the network equipment DUT according to the test script;

storing a record for the network flow including a first flow identifier for the network flow based on a first payload of the first message;

receiving a second message from the network equipment DUT and determining that the second message belongs to the network flow by determining a second flow identifier based on a second payload of the second message and matching the second flow identifier to the first flow identifier;

capturing a flow tuple from the second message, adding the flow tuple to the record for the network flow in a flow map table, and determining that one or more subsequently received messages belong to the network flow using the flow tuple; and analyzing the subsequently received messages in accordance with the test script and producing a test report for the network equipment DUT based on analyzing the subsequently received messages.

\* \* \* \* \*